(12) United States Patent
Maeda

(10) Patent No.: US 7,006,063 B2
(45) Date of Patent: Feb. 28, 2006

(54) DISPLAY UNIT AND DISPLAY DEVICE

(75) Inventor: Shuichi Maeda, Yokohama (JP)

(73) Assignee: Oji Paper Co., Ltd., Tokyo (JP)

( * ) Notice: Subject to any disclaimer, the term of this patent is extended or adjusted under 35 U.S.C. 154(b) by 264 days.

(21) Appl. No.: 10/350,650

(22) Filed: Jan. 24, 2003

(65) Prior Publication Data

US 2003/0142049 A1    Jul. 31, 2003

(30) Foreign Application Priority Data

Jan. 31, 2002    (JP)    ............................. 2002-024426

(51) Int. Cl.
G09G 3/34    (2006.01)
(52) U.S. Cl. ....................................... 345/84; 345/107
(58) Field of Classification Search ................. 345/84, 345/107
See application file for complete search history.

(56) References Cited

U.S. PATENT DOCUMENTS

| | | | |
|---|---|---|---|
| 5,429,503 A | | 7/1995 | Murata et al. |
| 5,961,804 A | * | 10/1999 | Jacobson et al. ........... 204/606 |
| 6,017,584 A | | 1/2000 | Albert et al. |
| 6,247,987 B1 | | 6/2001 | Moore |
| 6,611,100 B1 | * | 8/2003 | Moore ......................... 313/582 |
| 6,864,865 B1 | * | 3/2005 | Maeda ......................... 345/55 |
| 6,876,476 B1 | * | 4/2005 | Miura et al. ................. 359/252 |

FOREIGN PATENT DOCUMENTS

| | | |
|---|---|---|
| EP | 0994455 A2 | 4/2000 |
| GB | 2034640 A | 6/1980 |
| JP | 50-15115 | 6/1975 |
| JP | 64-086116 | 3/1989 |
| WO | WO 01/65309 A2 | 9/2001 |

OTHER PUBLICATIONS

European Search Report for corresponding Application No. EP 03290222, mailed May 24, 2004, ISA/EPO.

* cited by examiner

Primary Examiner—Jimmy H. Nguyen
Assistant Examiner—Steven Holton
(74) Attorney, Agent, or Firm—Harness, Dickey & Pierce, PLC

(57) ABSTRACT

A display unit includes a transparent hollow tube member, and a display liquid sealed in the transparent hollow tube member. The display liquid includes a liquid and at least one kind of charged or non-charged particle dispersed in the liquid. An image formed by a display device including the display units is kind to the eye in the same way as printed matter, and does not cause eyestrain due to flickering of emitted light.

6 Claims, 4 Drawing Sheets

DISPLAY UNIT

RESIN DISCHARGE HOLE    GAS DISCHARGE HOLE

DISPLAY UNIT AND DISPLAY DEVICE

BACKGROUND OF THE INVENTION

1. Field of the Invention

The present invention relates to a display device and to a display unit. More specifically, the present invention relates to a display device which may be used as a display of a personal computer, a mobile phone, a mobile terminal, etc., or which may be used as an independent portable display, such as a digital (or electronic) paper or a digital book that obtains information from such appliances. Also, the present invention relates to a display unit which forms such a display device.

2. Description of Related Art

Display devices such as that shown in FIG. 5 are conventionally known as disclosed in Japanese Examined Patent Application, Second Publication, No. Sho 50-15115. In the display device shown in FIG. 5, glass plates 1 and 2, at least one of which is optically transparent, are disposed so as to oppose each other via wall members 3 with a predetermined distance therebetween, and thereby an enclosed space 4 is formed by the glass plates 1 and 2 and the wall members 3. Also, transparent electrodes 5 and 6 of a flat shape made of, for instance, an indium-tin oxide (ITO) are fixed on the inner surface of the glass plates 1 and 2, respectively. Moreover, display liquid 7 is filled in the enclosed space 4. The display liquid 7 includes a colored dispersion medium 7a which may be colored black, for instance, and white charged particles 7b dispersed in the dispersion medium 7a.

In the above display device, when positive voltage is applied to the upper electrode 5 and negative voltage is applied to the lower electrode 6 as shown in FIG. 6A, the above-mentioned white charged particles 7b, which have been negatively charged, electrophoretically move towards the anode due to Coulomb force, and attach to the surface of the anode (i.e., the upper electrode) 5. When the display device in this state is viewed from a position indicated by the arrow shown in FIG. 6A, portions on which the white charged particles 7b have attached and have formed a layer thereof appear white through the transparent electrode 5 and the glass plate 1. On the other hand, if the polarity of the applied voltage is reversed, the white charged particles 7b attach to the electrode 6 on the other side and form a layer thereon as shown in FIG. 6B. Accordingly, when the display device in this state is viewed from a position indicated by the arrow shown in FIG. 6B, the display surface looks black since the layer of the white particles 7b is hidden by the black dispersion medium 7a. In this device, once the white charged particles 7b attach to either of the electrodes, it is not necessary to apply the voltage to the electrode other than maintaining the attached state of the charged particles 7b.

Since the above-mentioned display device is of a light reflecting type, an image formed by the display device is kind to the eye in the same way as printed matter, and does not cause eyestrain due to flickering of emitted light.

However, in the display device explained above, a problem of uneven contrast may be caused due to the aggregation of the charged particles (for instance, zinc sulfide) 7b or the attachment of the particles to the electrodes, etc. In order to solve this problem, another type of display devices have been proposed which includes, in an enclosed space formed between electrodes, a plurality of spherical microcapsules in which charged particles are dispersed in a dispersion medium, and binding material used for filling the gap among the microcapsules as disclosed in Japanese Unexamined Patent Application, First Publication, No. Sho 64-86116 and U.S. Pat. No. 6,017,584. According to the display device, the above-mentioned problem of uneven contrast can be solved, and the resolution of the display may be improved.

However, the display device explained above also has problems derived from using a technique to form microcapsules. That is, in a procedure for synthesizing microcapsules, it is difficult to obtain microcapsules with a uniform size distribution. If the sizes of the microcapsules are not uniformly distributed, it becomes difficult to obtain a display layer of uniform thickness using the microcapsules. Also, if the sizes of the microcapsules are not even, the distance the charged particles migrate in each of the microcapsules becomes different. This means that the response time necessary for switching displays becomes different for each of the microcapsules.

On the other hand, since it is difficult to obtain microcapsules of uniform size during a synthesizing process, it may be possible to select only microcapsules of the same size using a filtering process, for example, after synthesizing the microcapsules. However, in this case, other problems, such as damage to the microcapsules while passing through the filter, may be caused.

This fragility of the microcapsules is problematic not only during the manufacturing process thereof, but also after the microcapsules are made into a product and are used by a user. For example, when a display device is formed on a flexible plate to be used as an electronic paper, the microcapsules may be damaged when the plate is bent, and the display liquid may leak from the damaged portions.

SUMMARY OF THE INVENTION

Accordingly, an object of the present invention is to provide a display unit, a display device, and a display method in which the above-mentioned problems in the quality of the display are solved, and the images formed are kind to the eye in a manner similar to that of printed matter and do not cause eyestrain due to flicking of emitted light.

The above object may be achieved by a display unit which includes a transparent hollow tube member, and a display liquid sealed in the transparent hollow tube member, the display liquid including a liquid and at least one kind of particle dispersed in the liquid.

In accordance with another object of the invention, the particles dispersed in the liquid may be charged particles.

The present invention also provides a display device including a plurality of the above display units arranged over substantially the entire display region of the display device.

In yet another aspect of the invention, in the above display device, substantially all of the plurality of display units are arranged so as to be substantially parallel to each other.

In yet another aspect of the invention, the display device further includes an electric field application device which applies an electric field to the display unit.

The present invention also provides a method for displaying colors on a display by using the above display device, including the step of: applying an electric field corresponding to an image signal to the display units.

According to the present invention having the above-explained configuration, it becomes possible to form a display unit which is more uniform and strong as compared with one made by a technique to form microcapsules, using hollow fibers which may be prepared by a melt spinning method. In this manner, it becomes possible to produce an electrophoretic display device having a uniform response time, and strength sufficient to prevent the display liquid from leaking.

Also, according to embodiments of the present invention, since each display unit formed by the hollow tube member is independent of the others, it may be produced by using a simple manufacturing method, such as a coating method, similar to microcapsules. For example, a display device may be produced by dispersing display units in a liquid containing binder components and applying it onto a sheet shape supporting medium. Moreover, a display layer of the display units made of the hollow tube members may be formed on a paper using a technique similar to the application process. That is, the display device may be produced by spreading the display units onto a mesh type supporting medium and then removing the liquid so that the display units are entangled to form a sheet. If the display units are arranged in a certain direction when produced, it becomes possible to arrange the display units in parallel, or if they are laminated in an orthogonal direction (i.e., a vertical direction), it is possible to form a display region in a lattice form.

Furthermore, as shown in FIG. 2, the display portion in the display unit may be shown larger than its actual size due to a so-called "convex lens effect" of the side surface (i.e., the circumferential surface) of the hollow tube member containing the display liquid. Therefore, the apparent surface area of the display device with respect to the entire display region is shown larger than its actual area, and as a result, an excellent contrast may be obtained.

BRIEF DESCRIPTION OF THE DRAWINGS

Some of the features and advantages of the invention have been described, and others will become apparent from the detailed description which follows and from the accompanying drawings, in which.

DETAILED DESCRIPTION OF THE INVENTION

The invention summarized above and defined by the enumerated claims may be better understood by referring to the following detailed description, which should be read with reference to the accompanying drawings. This detailed description of particular preferred embodiments, set out below to enable one to build and use particular implementations of the invention, is not intended to limit the enumerated claims, but to serve as particular examples thereof.

Display Liquid:

According to an embodiment of the present invention, an image is formed when particles contained in the display liquid which is filled in hollow tube members are moved by some kind of external driving force. As an example of a source of the external force, an electric field is most typical, but other sources, such as a magnetic field, light, heat, and so forth may also be utilized.

Figure 1:
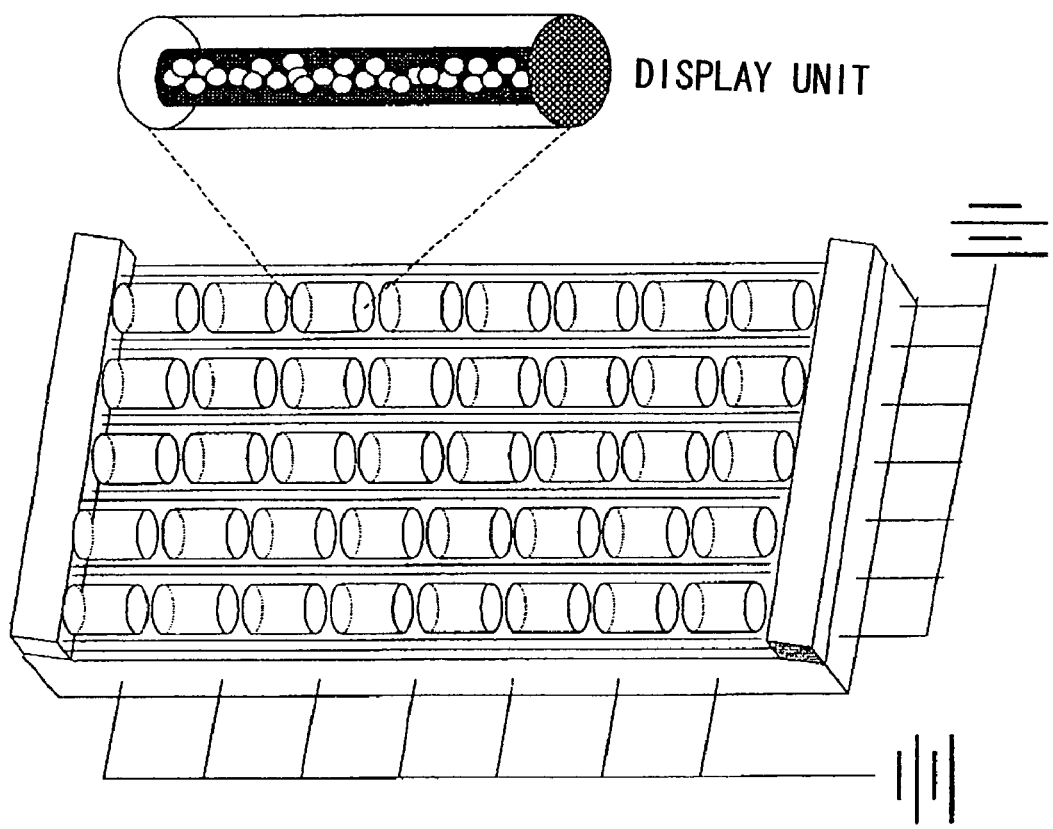
FIG. 1 is a schematic diagram showing a display device according to an embodiment of the present invention in which one of the display units is shown in an enlarged scale.
Figure 2:
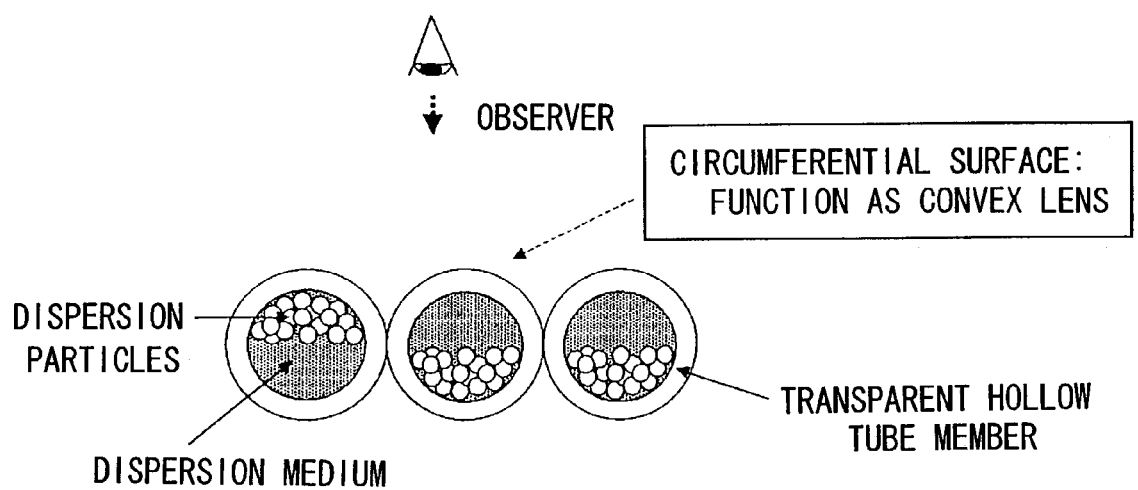
FIG. 2 is a schematic diagram showing a cross-sectional view in the width direction of the display units according to an embodiment of the present invention.

As shown in FIG. 1, the display liquid according to an embodiment of the present invention is filled and sealed in a hollow tube member. When an electric field is externally applied to the display device based on an image signal, each of the charged particles in the display liquid moves in accordance with the direction of the electric field due to the force of the electric field functioning as a driving force. Accordingly, a color which corresponds to the image signal and movement of the charged particles becomes visible from the outside through the transparent tube member. Once the charged particles are moved and fixed to a certain point, the fixed state, or the display state, of the particles is maintained due to the static friction, etc., which acts between the charged particles and the inner surface of the tube member even if the application of the electric field is stopped.

Hollow Tube Member and Display Unit:

A hollow tube member used according to an embodiment of the present invention has a cylindrical shape with a circular hole present inside thereof which is substantially concentric with the circumference of the member.

According to an embodiment of the present invention, the hollow tube member and a display unit may be produced in accordance with the following procedures.

A polymeric fiber having a two-layer structure of substantially concentric rings in cross section is formed by using, for instance, a melt spinning method, and the polymeric fiber is stretched to obtain a fiber having an external diameter of about 20–200 $\mu$m. The resin used for forming the inner layer of the fiber is a resin which may be dissolved in water or an organic solvent after the formation of the fiber. By removing the inner layer made of such a resin using water or an organic solvent, a hollow fiber may be obtained. Alternatively, if a fluid (e.g., a gas, a liquid, etc.) is introduced beforehand instead of the soluble resin forming the inner layer, it becomes unnecessary to remove the resin afterwards, and hence, the hollow fiber may be produced in an easier and simpler manner. It is preferable to use a gas, such as nitrogen gas or air, as the fluid introduced. Then, a display liquid prepared in advance is impregnated with the transparent hollow fiber thus produced. More specifically, a plurality of the hollow fibers in a bundle is placed in a chamber and the chamber is evacuated. Then, the display liquid is introduced into the chamber so that the display liquid is drawn into and fills the inside of the hollow fibers. After this, an end portion of a fiber is plugged or sealed while being cut to an appropriate length to form a display unit including a hollow tube member in which display liquid is contained.

Display Device:

According to an embodiment of the present invention, a display device may be produced by, for example, applying a liquid in which the above-mentioned display units are dispersed, onto a thin supporting medium having a sheet shape, and forming a display device having a sheet shape. Alternatively, the dispersion liquid may be spread onto a mesh shape supporting medium, and the fluid portion of the dispersion liquid may be removed to form a sheet having a plurality of display units in an entangled manner.

Also, a continuous yarn of a hollow component containing the display liquid (hereinafter referred to as a "string" for simplicity) may be used.

That is, a plurality of windings of the string are set and the string is reeled out at the same time so that the plurality of the strings are placed and stuck together on a substrate sheet which is also released from a winding thereof. Then, portions of the strings are press-sealed using a hot sealing bar with constant intervals. After this, a middle of the sealed portions is cut together with the substrate sheet using a cutter to obtain sheet-fed display devices.

By providing devices capable of applying electric field or magnetic field, for instance, with portions of the above-mentioned sheet, it becomes possible to write, delete, and rewrite information by means of the display device. Any known means capable of applying an electric field, magnetic field, and so forth may be applied to the device. When an electrode plate is provided with the above display unit, glass is generally used for the upper electrode plate. However, it is possible to use a transparent plastic made of, for instance, a polycarbonate resin, an acrylic resin, such as polymethylmethacrylate, and a styrenic resin, such as styrene-acrylonitrile copolymer, for the upper electrode plate. It is preferable that the wire of the electrode plate be vapor deposited with ITO. As for the lower electrode plate, on the other hand, it is possible to use an opaque electrode material, such as a metal, since transparency is not necessary for the lower electrode.

Figure 3A:
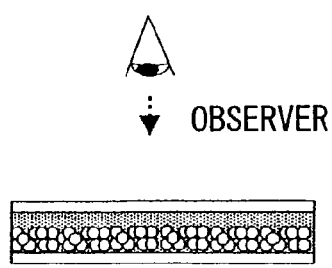
FIG. 3A is a schematic diagram showing a cross-sectional view in the length direction of the display unit before the display device is activated.
Figure 3B:
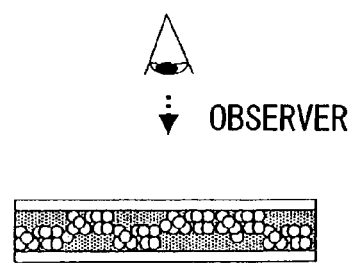
FIG. 3B is a schematic diagram showing a cross-sectional view in the length direction of the display unit after the display device is activated.

In the following an embodiment of the present invention will be described with reference to the accompanying drawings. FIGS. 3A and 3B are diagrams showing a schematic cross-sectional view of a display unit according to an embodiment of the present invention. FIG. 3A shows a state of image display before the display device is activated, and FIG. 3B shows a state of image display after the display device is activated, i.e., after information is written.

In FIG. 3A, since the specific gravity of the dispersion medium and that of the dispersed particles are different, and the specific gravity of the dispersed particles is generally larger, the dispersed particles are located at the lower side of the display unit. In FIG. 3B, on the other hand, portions of which an external driving force, such as an electric field, is applied, the dispersed particles move to the upper side of the display unit. Accordingly, the observer viewing the display unit from above can recognize the difference between the color (contrast) of the dispersion medium and the dispersed particles as a character or an image.

Note that in FIGS. 3A and 3B, although a system in which one kind of white dispersed particle moves in a colored dispersion medium in the display unit is shown, two or more kinds of dispersed particles may be contained and moved in the display unit. For instance, it is possible to move two kinds (e.g., black and white) of dispersed particles having different charge density or magnetic density in a transparent dispersion medium. In such a case, a character or an image is displayed by means of a contrast of black and white.

FIG. 1 is a diagram showing a device in which the display units are arranged in a sheet shape, and wires are provided so that an electric field is applied to the display liquid. Note that in FIG. 1, although transparent tube members forming the display units are not accurately shown, the relationship between the display unit and the display liquid is shown in a magnified scale at the upper side of the diagram. Also, although electrode plates are not shown in FIG. 1, the electrode plates are actually present in the device and disposed so as to sandwich the display units from the up-and-down direction, and at least the upper electrode plate is transparent. When the electric field is generated between the two electrode plates, the Coulomb force is exerted to the charged particles contained in the display liquid, and contrast is generated in accordance with the movement of the charged particles. As mentioned above, one or more kinds of charged particles may respond to the electric field generated. Also, although the display units are arranged in parallel in the display device shown in FIG. 1, the display units may be arranged to be a tangled state.

Next, embodiments of the present invention will be described; however, it is understood that the present invention is not by any means intended to be limited to these embodiments.

Embodiment:

First, display liquid was prepared by placing Oil Blue-N (0.5 g, a product of Aldrich Co.), Sudan Red (0.5 g, a product of Aldrich Co.), tetrachloroethylene (417.25 g, a product of Aldrich Co.), and Isoper-G (73.67 g, a product of Exxon Chemical Co.) in a 1 L flask, and stirring the mixture for six hours at 60° C. pursuant to a method disclosed in U.S. Pat. No. 6,017,584. After the mixture was cooled to room temperature, a portion (50.13 g) of the mixture was placed in a 50 mL tube for centrifugation. Titanium dioxide (1.8 g, a product of Aldrich Co.), 10% OLOA diluted by tetrachloroethylene (0.18 g, a product of Chavelon Oronite Co.), and Span 85 (0.15 g, a product of Aldrich Co.) were added to the tube, and the mixture was placed in a sonicator for five minutes to disperse and dissolve the additives. As a result, a desired display liquid was obtained.

In this display liquid, titanium dioxide which is the dispersed component displays white, and Oil Blue-N and Sudan Red displays blue.

Figure 4:
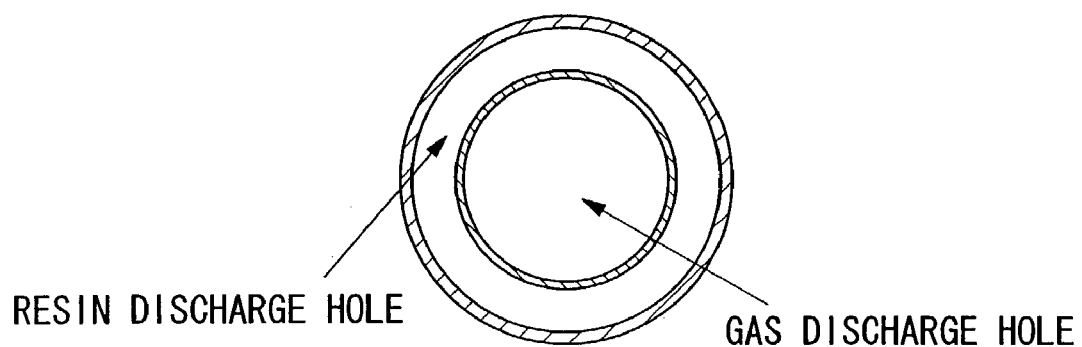
FIG. 4 is a diagram showing a schematic cross-sectional view of a mouthpiece of an extruder used for a production of hollow tube members according to an embodiment of the present invention.
Figure 5:
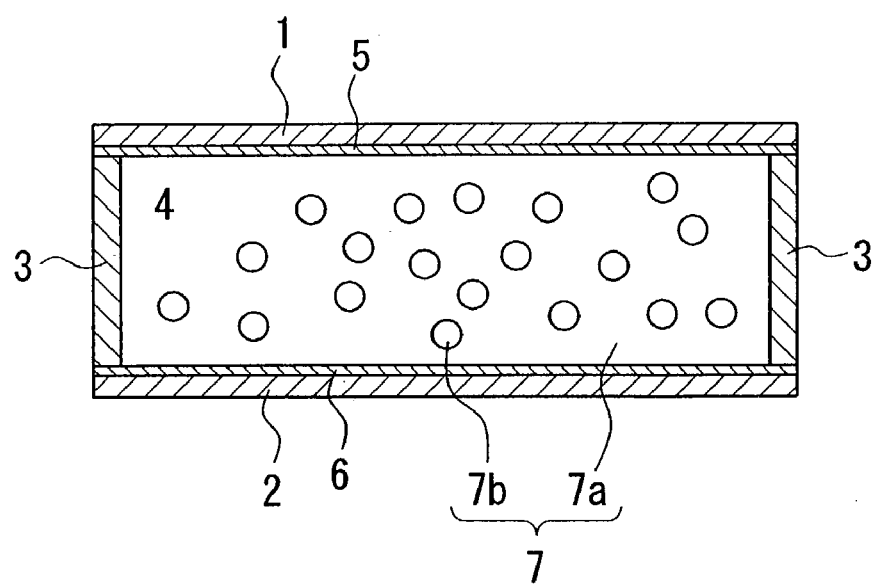
FIG. 5 is a diagram showing a conventional electrophoretic display device prior to activation.
Figure 6A:
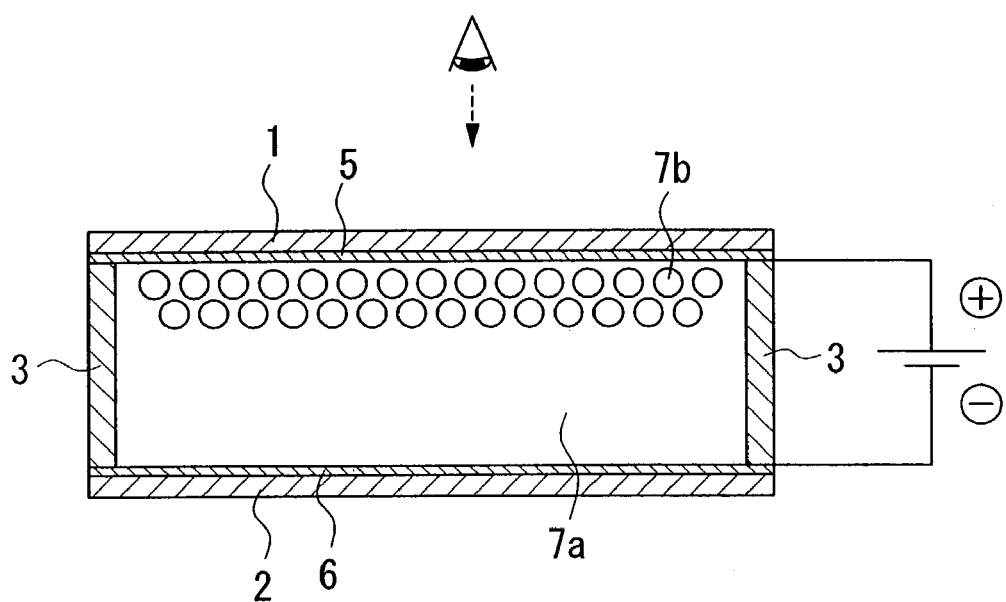
FIGS. 6A and 6B are diagrams showing conventional electrophoretic display devices after activation.
Figure 6B:
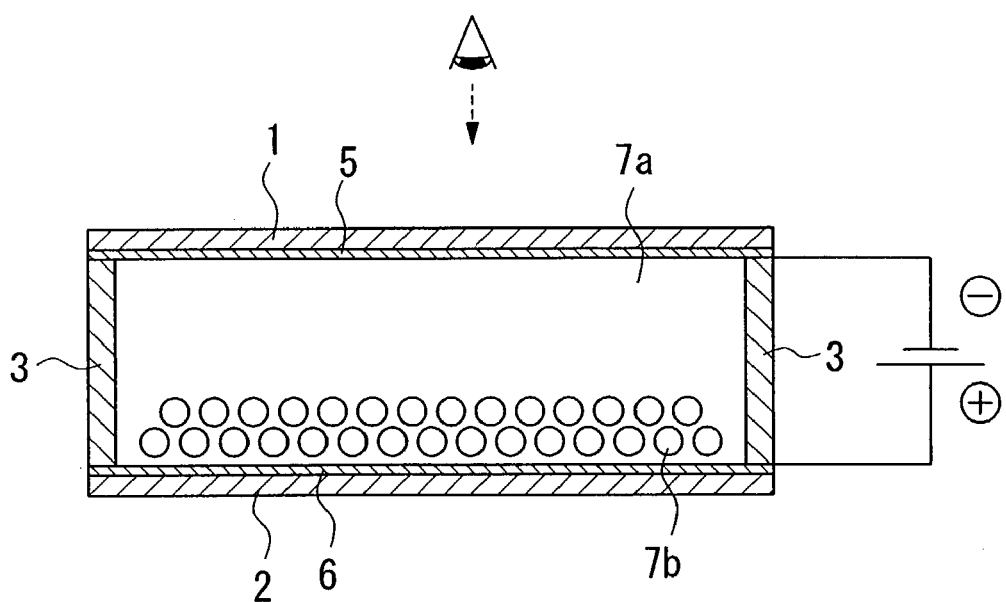

A hollow tube member was prepared as follows. While a nitrogen gas was discharged from a central hole of a mouthpiece, which is schematically shown in FIG. 4, of an extruder, ethylene-vinyl acetate copolymer having a 25% copolymer ratio of vinyl acetate was extruded from a discharge hole surrounding the central hole. The temperature of the extruder was set to be 230° C. and the pressure of the nitrogen gas was maintained substantially at atmospheric pressure. The extruding rate of melted ethylene-vinyl acetate was 0.15 kg/hr. The melted fiber discharged from the hole of the extruder was stretched to obtain a hollow fiber having an outer diameter of 160 $\mu$m and an inner diameter of 80 $\mu$m.

After this, a bundle of the hollow fibers obtained was placed in a chamber and the chamber was evacuated. Then, the above display liquid was introduced into the chamber so that the display liquid was drawn into and filled the inside of the hollow fiber.

Then, the hollow fibers containing the display liquid were cut so that the length thereof became about 3 mm by using a cutter whose cutting edge was heated. The end portions of the hollow fibers were sealed when cut because of the heat at the cutting edge of the cutter which melted and plugged the cut portions of the hollow fibers. In this manner, display units including hollow tube members containing the display liquid inside thereof were obtained. Also, when the display units obtained were bent, they were not destroyed, and hence, no display liquid leaked from the inside.

The display units obtained were formed into a substantially uniform web (matrix), and dispersed in a solution containing water-dispersible polyurethane HUX-381 (a product of Asahi Denka Kogyo KK) as a binder component in a weight ratio of 10% converted to solid components with respect to the above display units. This was subjected to a needling process onto a foundation cloth made of filament yarn of nylon 66. In this manner, a sheet type display unit having a width of about 500 μm was prepared.

After this, the above-mentioned sheet of the display unit was sandwiched by transparent electrode plates in the up-and-down direction to produce a display device. The electrode plates were made of polyethylene terephthalate (PET) film, and one surface thereof was vapor deposited with ITO. When a positive charge was given to the upper electrode and a negative charge was given to the lower electrode using a direct current power source and the voltage difference between the electrodes was set to be 200 V, titanium dioxide in the display liquid moved to the upper electrode plate (i.e., the display side) to show white on the display surface. When the direction of the electric current was reversed, titanium dioxide moved to the lower electrode plate to show blue on the display surface. The optical image concentration of the display surface was measured by using a Macbeth densitometer, and the ratio of image concentration when blue was displayed with respect to when white was displayed was measured as a contrast ratio.

The contrast ratio of the display device prepared in the embodiment of the present invention was 5:1, which was the same level as the printing quality of a newspaper.

As explained above, according to the present invention, a display device of a light receiving type device may be easily produced which is capable of forming an image that is kind to the eye in a manner like that of printed matter, and does not cause eyestrain due to flickering of emitted light. Also, according to the present invention, since a display device which is capable of accurately reproducing image information is obtained, a significant contribution may be made to industry.

Having thus described example embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. A display unit, comprising:
   a transparent hollow tube member; and
   a display liquid sealed in said transparent hollow tube member, said display liquid including liquid and at least one kind of charged particle dispersed in said liquid, wherein said transparent hollow tube member has a cylindrical shape so that at least a part of a circumferential surface of said transparent hollow tube member having convex lens effect enlarges a display portion in said transparent hollow tube member.

2. A display device, comprising:
   a display unit as claimed in claim 1, wherein
   a plurality of said display units is arranged over substantially an entire display region of said display device.

3. A display device as set forth in claim 2, wherein substantially all of said plurality of display units are arranged so as to be substantially parallel to each other.

4. A display device as set forth in claim 2, further comprising:
   an electric field application device which applies an electric field to said display units.

5. A method for displaying colors on a display by using a display device as claimed in claim 4, comprising the step of:
   applying an electric field corresponding to an image signal to said display units.

6. A display device as set forth in claim 2, wherein substantially all of said plurality of display units are arranged so as to be in a lattice form.

* * * * *